United States Patent [19]

Udagawa

[11] Patent Number: 5,062,649
[45] Date of Patent: Nov. 5, 1991

[54] STEEL LAMINATE GASKET WITH WIDE SEALING AREA

[75] Inventor: Tsunekazu Udagawa, Ichikawa, Japan

[73] Assignee: Ishikawa Gasket Co., Ltd., Tokyo, Japan

[21] Appl. No.: 546,839

[22] Filed: Jul. 2, 1990

Related U.S. Application Data

[63] Continuation-in-part of Ser. No. 243,528, Sep. 12, 1988.

[51] Int. Cl.⁵ ............................................. F16J 15/08
[52] U.S. Cl. ............................... 277/235 B; 277/236
[58] Field of Search ........... 277/235 B, 235 R, 235 A, 277/236

[56] References Cited

U.S. PATENT DOCUMENTS

| | | | |
|---|---|---|---|
| 1,815,602 | 7/1931 | Russell | 277/235 B |
| 1,846,402 | 2/1932 | Oven | 277/232 |
| 1,911,226 | 5/1933 | Fitzgerald | 277/231 |
| 1,982,759 | 12/1934 | Rosen | 277/235 B |
| 2,034,610 | 3/1936 | Dickson | 277/235 B |
| 2,130,110 | 9/1938 | Victor et al. | 277/237 |
| 3,567,234 | 3/1971 | Skrycki | 277/235 B |
| 3,738,558 | 6/1973 | Colwell | 277/235 B |
| 4,254,963 | 3/1981 | Skrycki | 277/235 R |
| 4,739,999 | 4/1988 | Ishii et al. | 277/235 B |
| 4,759,585 | 7/1988 | Udagawa | 277/235 B |

Primary Examiner—William A. Cuchlinski, Jr.
Assistant Examiner—Daniel G. DePumpo
Attorney, Agent, or Firm—Kanesaka and Takeuchi

[57] ABSTRACT

A steel laminate gasket of the invention is installed in an internal combustion engine. The gasket basically comprises a first plate, a third plate, and a second plate situated between the first and third plates. The first plate includes a base portion extending substantially the entire area of the gasket and located adjacent to the second plate. The first plate further includes a curved portion to define a hole of the engine, and a flange at the side of the base portion. A side wall is formed on the base portion or the flange spaced from the curved portion, so that an embossed portion is defined by the side wall and the curved portion. The third plate includes a flat solid portion situated under the embossed portion. When the gasket is tightened, the solid portion receives and supports tightening pressure to seal around the hole, and the side wall forms a secondary seal therearound.

12 Claims, 2 Drawing Sheets

STEEL LAMINATE GASKET WITH WIDE SEALING AREA

CROSS REFERENCE TO RELATED APPLICATION

This is a continuation in part application of Ser. No. 243,528 filed on Sept. 12, 1988 and now U.S. Pat. No. 4,938,488.

BACKGROUND OF THE INVENTION AND RELATED ART STATEMENT

The present invention relates to a steel laminate gasket for an internal combustion engine, which can provide wide and high sealing pressure to securely seal around a hole.

The steel laminate gasket of the present invention may be used widely, such as a regular gasket situated between two engine blocks, such as a cylinder head gasket and a manifold gasket. When the gasket of the present invention is used as a cylinder head gasket, the gasket may seal around cylinder holes Hc, water holes Hw, oil holes Ho, bolt holes Hb and the like, as shown in FIG. 1. However, it is preferable to seal around a relatively large hole, such as a cylinder hole Hc.

In a gasket, a main subject of a gasket is to securely seal around a hole. Therefore, when a gasket is designed, attention has been paid how a portion around a hole is securely sealed. In this respect, there have been proposed many methods.

One of the conventional methods to seal around a hole is to form a bead around a hole. As shown in FIG. 2, for example, a gasket 20 comprises an upper plate 21, a lower plate 23, and a middle plate 22 having a bead 22a around a cylinder hole Hc. In the gasket 20, the bead 22a only provides a sealing pressure around the cylinder hole Hc. Therefore, fluid passing through the hole Hc may permeate through the plates. The sealing ability of the gasket 20 is not good.

In view of the prior art, a gasket 25 as shown in FIG. 3 has been proposed in Ser. No. 193,215 filed on May 11, 1988. The gasket 25 comprises an upper plate 26 with a curved portion 26a and a flange 26b, and a lower plate 27. The gasket 25 can securely seal around the hole Hc. However, since an area around the hole Hc is only sealed by the curved portion 26a, the sealing area that forms sealing pressure is relatively narrow. Further, since the curved portion may strongly abut against the engine block, in case the engine blocks are formed of an aluminum alloy, the engine blocks may deform at the curved portion. Therefore, a gasket with a relatively wide sealing area without affecting the engine blocks has been desired.

In a patent application Ser. No. 243,528 filed on Sept. 12, 1988, a gasket can provide relatively strong sealing pressure around a hole. However, in case the gasket is not completely tightened, creep relaxation may occur around a hole in a long usage.

Accordingly, one object of the present invention is to provide a steel laminate gasket, which can provide wide and high sealing pressure around a hole to be sealed.

Another object of the present invention is to provide a steel laminate gasket as stated above, which can be easily tightened strongly to seal around a hole without causing any damage to engine blocks.

A further object of the present invention is to provide a steel laminate gasket as stated above, which can provide a second seal around a hole to be sealed.

A still further object of the present invention is to provide a steel laminate gasket as stated above, which can be easily and economically manufactured.

Further objects and advantages of the invention will be apparent from the following description of the invention.

SUMMARY OF THE INVENTION

In accordance with the present invention, a steel laminate gasket is installed in an internal combustion engine having at least one hole therein.

The gasket basically comprises first, second and third plates. The first plate includes a base portion, at least one curved portion to define a hole and at least one flange situated over the base portion. The base portion, curved portion and flange are integrally formed together. At least one side wall is formed on the base portion or the flange spaced from the curved portion. The distance between the flange and the base portion laterally inside the side wall is greater than that laterally outside the side wall. An embossed portion is defined between the side wall and the curved portion.

The second plate is situated under the first plate and is provided with a hole larger than the outer configuration of the flange. Therefore, when the gasket is assembled, the flange of the first plate is located inside the hole of the second plate.

The third plate is situated outside the second plate at a side opposite the first plate. The third plate is provided with a flat solid portion situated between the flange and the base portion inside the embossed portion. The thickness of the solid portion is greater than that of the third plate. Therefore, when the gasket is tightened, the embossed portion is compressed and supported by the solid portion to thereby securely seal around the hole of the engine. At the same time, the side wall deforms, so that an outside portion of the solid portion is sealed by the deformed side wall.

The third plate includes a main portion and a flange turned over the main portion. The solid portion is formed by the flange and the main portion piled over the flange. The lateral width of the flange of the third plate is shorter than the lateral width of the embossed portion. Accordingly, when the gasket is tightened, the solid portion simply supports the flat portion of the embossed portion.

Preferably, when the gasket is properly tightened, the distance between the flange and a portion of the base portion laterally inside the side wall is greater than the distance between the base portion and the third plate laterally outside the side wall. As a result, an area around the cylinder hole can be strongly tightened.

DETAILED DESCRIPTION OF PREFERRED EMBODIMENTS

Figure 1:
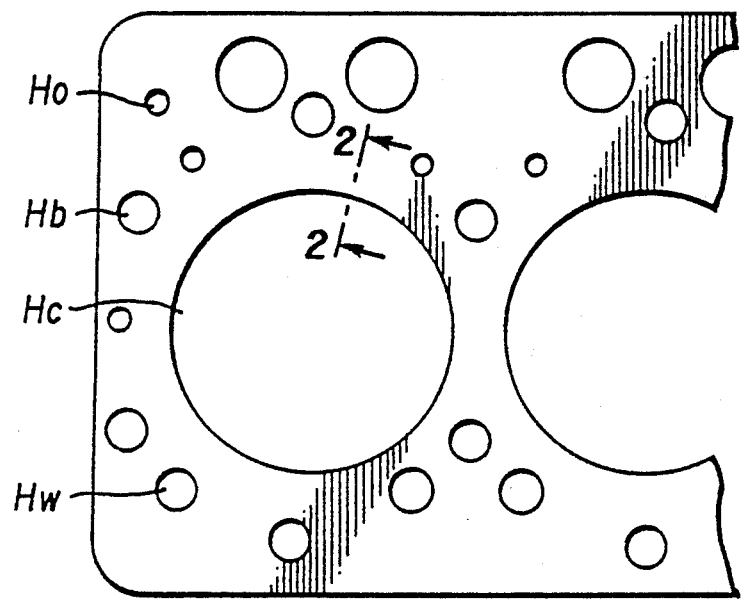
FIG. 1 is a partial plan view of a conventional steel laminate gasket.
Figure 2:
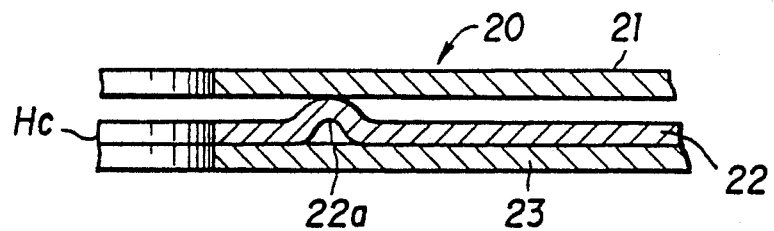
FIG. 2 is an enlarged section view taken along a ling 2—2 in FIG. 1.
Figure 3:
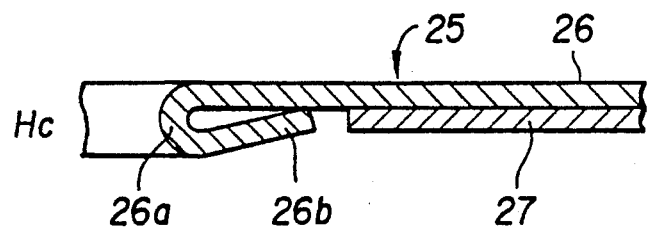
FIG. 3 is a section view, similar to FIG. 2, for showing a related invention.
Figure 4:
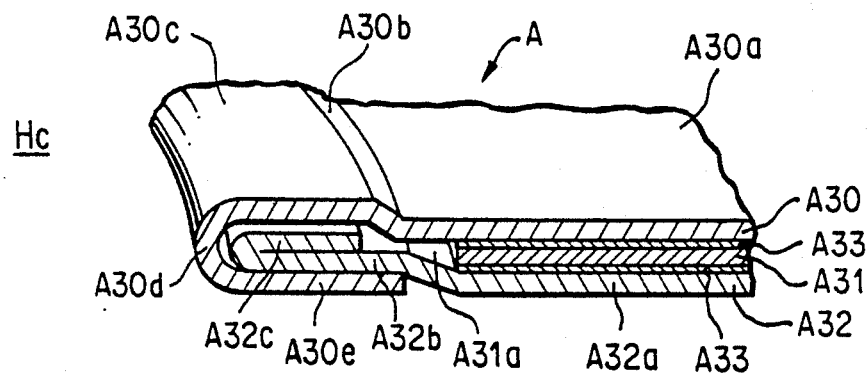
FIG. 4 is a perspective section view of a part of a first embodiment of a steel laminate gasket of the present invention.
Figure 5:
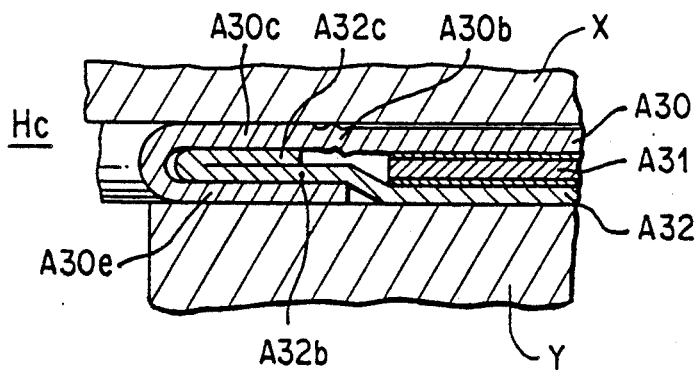
FIG. 5 is an explanatory section view for showing compressed condition of the first embodiment of the gasket of the invention.

Referring to FIGS. 4 and 5, a first embodiment A of a steel laminate gasket of the present invention is shown. The gasket A as shown in FIGS. 4 and 5 is a cylinder head gasket, similar to FIG. 1, and is provided with a plurality of holes, i.e. cylinder holes Hc, water holes Hw, oil holes Ho and bolt holes Hb. Areas around the cylinder holes Hc are sealed in accordance with the present invention. However, if required, areas around the water holes Hw, oil holes Ho and bolt holes Hb may be sealed as well.

The gasket A comprises an upper plate A30, a lower plate A32 and a middle plate A31 situated between the upper and lower plates A30, A32. The upper plate A30 is provided with a base portion A30a extending substantially throughout the entire area of the gasket, a diagonal side wall A30b extending diagonally and upwardly from the base portion A30a around the cylinder hole Hc, and an embossed portion A30c. The upper plate A30 also includes a curved portion A30d around the cylinder hole Hc to define the same, and a flange A30e situated under the embossed portion A30c.

The flange A30e is spaced apart from the embossed portion A30c and is situated parallel thereto, so that a space is formed between the flange A30e and the embossed portion A30c. An end portion of the flange A30e is located under the base portion A30a. However, if the flange A30e sufficiently supports a part of the third plate A32 located under the embossed portion A30c, the end portion of the flange A30e need not be located under the base portion A30a.

The middle plate A31 is situated under the base portion A30a of the upper plate A30. The middle plate A31 is provided with a hole A31a around the cylinder hole Ho. The diameter of the hole A31a is slightly larger than the outer configuration of the embossed portion A30c. The middle plate A31 may be provided with sealing means, such as a bead, around fluid holes.

The middle plate A31 is also provided with upper and lower coatings A33 covering the entire surface thereof to prevent fluid from entering into spaces between the plates from a fluid hole (not shown). The coatings A33 are made of soft materials to provide resiliency. Gum such as NBR gum, silicon gum and fluorine gum is preferred. The thickness of the coating A33 is 5-100 micra, preferably 10-50 micra.

The lower plate A32 is formed of a main portion A32a situated under the middle plate A31, an inner portion A32b situated above the flange A30e, and a flange A32c. Namely, the inner portion A32b is slightly bent relative to the main portion A32a to be located above the flange A30e. The flange A32c is turned over and located above the inner portion A32b. The inner portion A32b and the flange A32c form a solid portion, which can not be compressed when the gasket is tightened.

The lateral width of the flange A32c is substantially the same as that of the embossed portion A30c. Therefore, when the gasket is tightened, the embossed portion A30c is supported by the solid portion, i.e. the inner portion A32b and the flange A32c.

The total thickness of the gasket inside the side wall A30b, i.e. the sum of the thickness of the embossed portion A30c, the flange A30e, the inner portion A32b and the flange A32c, is substantially the same as the total thickness of the gasket outside the side wall A30b, i.e. the sum of the thickness of the base portion A30a, the middle plate A31 with the coatings A33 and the main portion A32a. The thickness of the gasket inside the side wall A30b may be slightly thicker than the gasket outside the side wall A30b, e.g. 0.05 to 0.1 mm, so that an area around the cylinder hole Hc can be tightly sealed when the gasket is tightened.

When the gasket A is assembled, there is formed a space between the embossed portion A30c and the flange A32c, while the base portion A30a, the middle plate A31 with the coatings A33 and the main portion A32a closely fit with each other.

As shown in FIG. 5, when the gasket A is situated between a cylinder head X and a cylinder block Y, and is tightened, the embossed portion A30c is compressed to abut against the solid portion, i.e. the flange A32c and the inner portion A32b, of the third plate A32. Since the solid portion is not compressed, it is possible to tighten the sealing area around the cylinder hole Hc.

When the embossed portion A30c is compressed against the solid portion, the side wall A30b is flattened. Since the side wall A30b has resiliency, a part of the side wall A30b adjacent the embossed portion A30c is strongly pushed against the cylinder head X. Namely, a secondary seal is formed around the cylinder hole Hc by means of the side wall A30b.

In the gasket A, since the embossed portion A30c is compressed against the flat and wide solid portion of the lower plate A32, the area around the cylinder hole can be strongly tightened without causing damage to the cylinder head and cylinder block. Further, the resiliency of the side wall A30b seals around the embossed portion A30c. As a result, the area around the cylinder hole Hc can be widely and evenly sealed.

Figure 6:
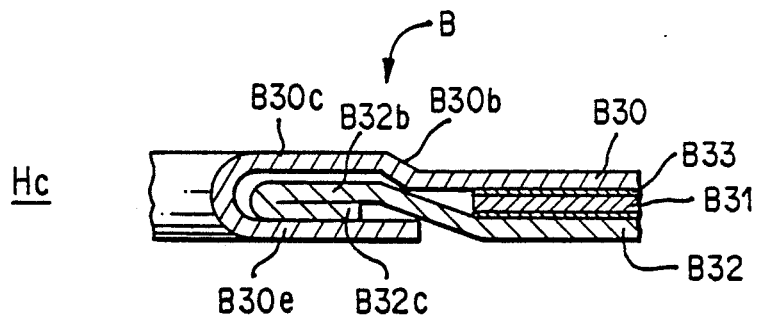
FIGS. 6 and 7 are section views, similar to FIG. 2, for showing second and third embodiments of the gasket of the invention.

FIG. 6 shows a second embodiment B of the gasket of the present invention. The gasket B comprises an upper plate B30 having a side wall B30b, an embossed portion B30c and a flange B30e, a middle plate B31 with coatings B33, and a lower plate B32, similar to the gasket A. In the Basket B, the lower plate B32 is provided with an inner portion B32b and a flange B32c, similar to the gasket A, but the flange B32c is located above the flange B30e. The gasket B operates as in the gasket A.

Figure 7:
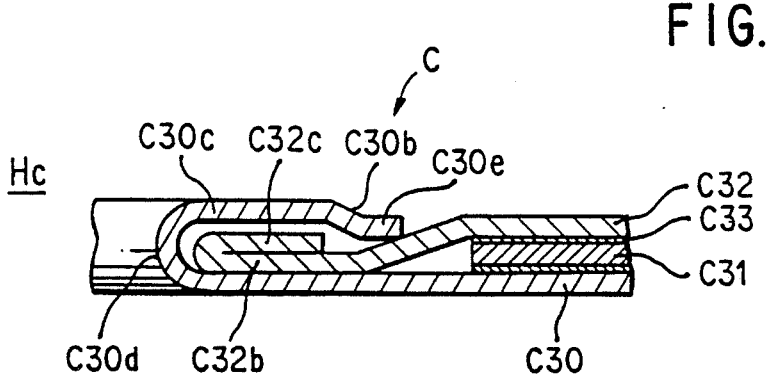

FIG. 7 shows a third embodiment C of the gasket of the present invention. The gasket C has a structure similar to the gasket A which is turned upside down, and comprises an upper plate C32 with an inner portion C32b and a flange C32c, a middle plate C31 with coatings C33, and a lower plate C30.

The lower plate C30 is provided with a curved portion C30d, an embossed portion C30c, a side wall C30b and an edge portion C30e. The lateral size of the flange C32c is substantially the same as that of the embossed portion C30c.

When the gasket C is situated between the cylinder head and cylinder block and is tightened, the edge portion C30e is, at first, compressed against the inner portion C32b. Then, the embossed portion C30c abuts against the flange C32c, so that when the gasket is tightened, the side wall C30b is deformed to provide secondary seal thereat. The gasket C operates as in the gasket A.

In the present invention, a side wall and an embossed portion are formed on a first plate having a curved portion for defining a cylinder hole. And a solid portion formed of an inner portion and a flange is formed on a third plate. A second plate is situated between the first and third plates. The solid portion of the third plate is placed under the embossed portion. Accordingly, when the gasket is tightened, an area around the cylinder hole or the embossed portion with the solid portion can be strongly tightened, and a secondary seal is obtained by the side wall. As a result, wide, even and strong sealing can be formed around the cylinder hole.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising,
   a first plate having at least one first hole therein corresponding to the hole of the engine, said first plate including a base portion, at least one curved portion integrally formed with the base portion to extend transversely with respect to the base portion to surround and define the first hole, at least one flange integrally formed with the curved portion and located at a side of the base portion to extend substantially parallel to the base portion and surrounding the first hole, at least one side wall formed at one of the base portion and the flange, said side wall being spaced apart from the curved portion to surround the first hole, and an area around the first hole surrounded by the side wall and the curved portion for forming an embossed portion,
   a second plate situated at a flange side of the first plate, said second plate having at least one second hole therein, the size of the second hole being larger than the size of the flange so that when the gasket is assembled, the flange is located inside the second hole, and
   a third plate situated adjacent to the second plate and having a solid portion situated between the flange and base portion inside the embossed portion, distance between an outer surface of the third plate and an outer surface of the base portion of the first plate laterally outside the side wall being smaller than distance between outer surfaces of the flange and the base portion laterally inside the side wall, thickness of the solid portion being greater than that of the third plate and thinner than an inner space between the flange and base portion inside the embossed portion so that when the gasket is tightened, the side wall deforms to seal thereat.

2. A steel laminate gasket according to claim 1, wherein said embossed portion has an outer surface which is substantially flat and parallel to an outer surface of one of the base portion and flange facing against the embossed portion.

3. A steel laminate gasket according to claim 2, wherein said third plate includes a main portion and a flange turned over the main portion, said solid portion being non-compressible and formed by the flange and the main portion piled over the flange.

4. A steel laminate gasket according to claim 3, wherein lateral width of the flange of the third plate is shorter than the lateral width of the embossed portion.

5. A steel laminate gasket according to claim 4, wherein the distance between the flange of the first plate and a portion of the base portion laterally inside the side wall, when the gasket is properly tightened, is greater than the distance between the base portion and the third plate laterally outside the side wall.

6. A steel laminate gasket according to claim 5, wherein difference between the distance laterally inside the side wall and the distance laterally outside the side wall is between 0.05 and 0.1 mm.

7. A steel laminate gasket according to claim 1, wherein said second plate further includes seal coatings on both sides thereof.

8. A steel laminate gasket according to claim 1, wherein the embossed portion is formed on the base portion.

9. A steel laminate gasket according to claim 1, wherein the embossed portion is formed on the flange of the first plate.

10. A steel laminate gasket according to claim 1, wherein said side wall of the embossed portion is positioned diagonally relative to one of the flange and the base portion.

11. A steel laminate gasket according to claim 1, wherein said embossed portion includes the lateral width shorter than the lateral width of the flange of the first plate.

12. A steel laminate gasket for an internal combustion engine having at least one hole therein, comprising,
    a first plate having at least one first hole therein corresponding to the hole of the engine, said first plate including a base portion, at least one curved portion integrally formed with the base portion to extend transversely with respect to the base portion to surround and define the first hole, at least one flange integrally formed with the curved portion and located at a side of the base portion to extend substantially parallel to the base portion and surrounding the first hole, at least one side wall formed at one of the base portion and the flange, said side wall being positioned to space apart from the curved portion to surround the first hole, and an area around the first hole surrounded by the side wall and the curved portion for forming an embossed portion,
    a second plate situated at a flange side of the first plate, said second plate having at least one second hole therein, the size of the second hole being larger than the size of the flange so that when the gasket is assembled, the flange is located inside the second hole, and
    a third plate situated adjacent to the second plate and having a solid portion situated between the flange and the base portion inside the embossed portion, distance between an outer surface of the third plate and an outer surface of the base portion of the first plate laterally outside the side wall being smaller than distance between outer surfaces of the flange and the base portion laterally inside the side wall, said distance between the outer surfaces of the flange and the base portion laterally inside the side wall, when the gasket is tightened, being reduced by deforming the side wall so that the flange, the base portion and the solid portion closely pile and abut against each other to thereby incompressibly seal around the hole of the engine, and the deformed side wall resiliently seals around the hole of the engine.

* * * * *